United States Patent [19]
Puhl et al.

[11] Patent Number: 5,131,038
[45] Date of Patent: Jul. 14, 1992

[54] PORTABLE AUTHENTIFICATION SYSTEM

[75] Inventors: Larry C. Puhl, Sleepy Hollow; Richard A. Comroe, Dundee; Robert W. Furtaw, Arlington Heights; Tracey L. Cantarutti, Barrington, all of Ill.

[73] Assignee: Motorola, Inc., Schaumburg, Ill.

[21] Appl. No.: 610,173

[22] Filed: Nov. 7, 1990

[51] Int. Cl.⁵ .......................... H04L 9/32; G07F 7/08
[52] U.S. Cl. ..................................... 380/23; 380/25; 380/30; 340/825.31; 340/825.34; 235/380; 235/382
[58] Field of Search .................. 364/200, 900; 380/3, 380/4, 23, 24, 25, 30, 49, 50; 235/379, 380, 382; 340/825.31, 825.34

[56] References Cited

U.S. PATENT DOCUMENTS

| | | | |
|---|---|---|---|
| 4,825,050 | 4/1989 | Griffith et al. | 235/379 |
| 4,993,068 | 2/1991 | Piosenka et al. | 380/23 |
| 4,995,081 | 2/1991 | Leighton et al. | 380/23 |
| 4,998,279 | 3/1991 | Weiss | 380/23 |

Primary Examiner—Bernarr E. Gregory
Attorney, Agent, or Firm—Jon P. Christensen

[57] ABSTRACT

A personal identity authentification system is provided in which parametric data of an authorized possessor is encrypted into a memory of a portable transceiver device. The portable transceiver device, carried by a possessor, may be activated by an identity request transmitted from a nearby, authorized verification device. Upon activation, the portable transceiver transmits the encrypted data to the verification device which, when decoded by a verification unit, provides positive identification of the authorized possessor.

20 Claims, 2 Drawing Sheets

PORTABLE AUTHENTIFICATION SYSTEM

FIELD OF THE INVENTION

This invention relates to identification systems and more specifically to identity authentification systems.

BACKGROUND OF THE INVENTION

Identity authentification systems are known. In their simplest form an identity authentification system may be comprised of a name-tag type identity badge and a security guard with the security guard denying access to a resource to any who cannot verify their identify through production of an identity badge.

A disadvantage of name-tag type identity badges is their transferability. An identity badge is typically effective in inverse proportions to the number of people carrying such badges.

An improvement on the concept of the identity badge is the inclusion of a picture of an authorized user within the identity badge (picture ID). The picture ID also suffers from shortcomings. The picture ID may be altered for use by someone other than the original authorized user. Another shortcoming may lie in the quality of the picture in that a number of people may have the same general physical characteristics and may easily pass for the authorized user.

In addition to authentification of a person within a facility, i.e. ID badge checking, identity authentification is commonly a requirement for operation of certain types of equipment or equipment systems. In such cases the user may type or speak a password, or insert a specialized key. Examples may include equipment as diverse as from computers to automobiles.

Recent improvements to identity authentification systems include fingerprint analyzers and retina scanners. Each of these technologies, though effective, still present some difficulty in implementation. Among the disadvantages include the technical difficulty in administering such tests and the expense of maintaining secure data bases.

In general, whenever authentification and verification of identity is required with a non-transferable attribute, an identifying device is employed. When the device must have the attribute of being non-transferable, a bio-metric (such as a photo, or fingerprint, or retina print) may be added to the device. Where the device must have the attribute of being non-forgible, the bio-metric may be encrypted.

Authentification and verification systems may serve a variety of applications. A personnel badge may be just one of the applications. Other applications include identification of automobiles, railroad box-cars, trucks, boats, airplanes, and almost any other kind of vehicle. Examples of such applications include locating stolen cars or automatically debiting a vehicle owner at a highway toll booth.

Encryption systems are also known. Encryption systems, in the past, have been applied to make information unintelligible to unauthorized parties. Encryption systems, more recently, are typically used in RF communication systems to prevent unauthorized monitoring of an information signal.

Encryption techniques typically involve generating an information signal and applying the signal to an encryptor which encrypts the information signal to produce a random or pseudo random signal that preferably resembles a noise signal.

Random or pseudo random signals may be generated by a suitable algorithm or through the use of a non-symmetric Public Key algorithm. A non-symmetric Public Key algorithm uses a encode key that is different from the decode key. The use of a non-symmetric Public Key algorithm assures that an attacker who knows the decode key (perhaps by accessing a decoding unit) may not be able compute the encode key in a reasonable time. Without the encode key an unauthorized user cannot transmit an encrypted signal within a given secure system (for a description of Public Key systems see "Cipher Systems" by Henry Beker and Fred Piper, John Wiley & Sons—Constable, 1982).

Because of the importance of identity authentification systems a need exists for a way to embed physical or biometric parameters of an authorized possessor under a suitable encryption technique into identity authentification devices that cannot be altered, or decoded, except by authorized parties.

As authentification devices become more sophisticated (because of encryption requirements or otherwise) memory requirements for storing data have increased. In part, because of increased memory volume, the problem of efficiently retrieving data from authentification memory devices has become more difficult. Credit cards were originally imprinted with numbers, which had to be typed into authentification terminals until the advent of magnetic coding. Reading the magnetic code, on the other hand, required physically passing the credit card through a reader. In many applications where authentification and identification involves large numbers of people or equipment it is desirable to automatically retrieve stored data relative to identify without a requirement for a specific physical act such as insertion of a ID card or the like.

A need exists for an apparatus to retrieve stored data based upon a proximal relationship of the identification device to a detection (verification) device. Such an apparatus would be useful in applications of high volume processing and also in systems involving encrypted signals where bio-metric or physical data may be encoded so as to appear as a random signal.

SUMMARY OF THE INVENTION

Pursuant to one embodiment of the invention an identity authentification system is offered comprising at least one identification transceiver, and at least one verification transceiver. The identification transceiver has a receiver for receiving transmitted identity requests from the verification transceiver, a memory, encrypted parametric data of an authorized possessor stored within memory, and a transmitter for transmitting the encrypted parametric data to the verification transceiver in response to the identity request. The verification transceiver comprises a transmitter for periodically transmitting identity requests, a receiver for receiving the transmitted, encrypted parametric data, a decryptor for decrypting the received parametric data, and a comparator for comparing the decrypted parametric data with measured parametric data of a possessor.

In one embodiment the identification transceiver is constructed to be sufficiently small and lightweight so as to be carried in a purse or pocket without discomfort. In use the identification transceiver may be interrogated by a verification transceiver activated by the possessor's attempt to open a door or pass a guard station. The encrypted parametric data may be a high resolution picture of an authorized possessor and may include such physical data as height and weight.

The verification transceiver upon receiving and decrypting the transmitted data may communicate the decrypted data to a TV monitor or other visual display whereby an operator visually compares the possessor against the displayed decrypted data.

In another embodiment of the invention the verification transceiver communicates the decrypted data to a computer, in turn, connected to a video camera equipped with a visual recognition system. The computer upon receiving the decrypted data compares the decrypted data to a video output from the visual recognition system to identify an authorized possessor.

In another embodiment of the invention the encrypted data includes indicia of identity such as a voice print of a spoken name. A possessor upon requesting access may be asked to verbally recite his name thereby providing a voice print which is then compared with a decrypted voice print before granting access.

In another embodiment of the invention the verification transceiver transmits an ID number along with the request for identification. The ID is used by the identification transceiver to select the encrypted data to be transmitted in response to the request for identification. Contained within the identification transceiver may be a number of encrypted data responses each stored under a different encryption key and transmitted only to a verification transceiver offering the proper ID.

DESCRIPTION OF A PREFERRED EMBODIMENT

Figure 1:
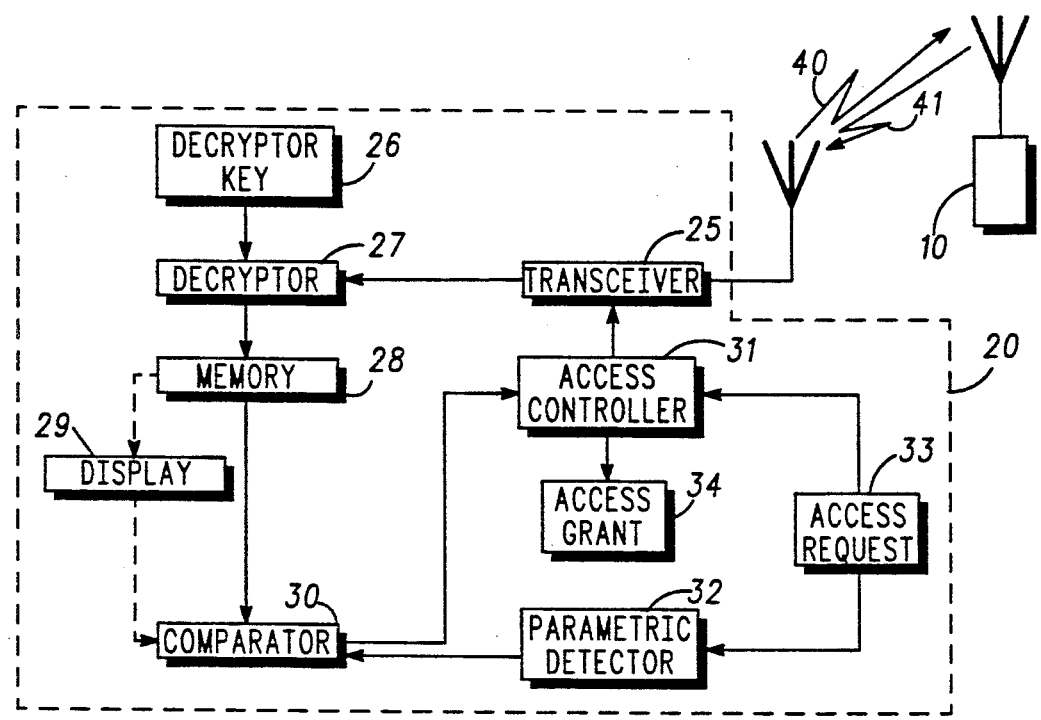
FIG. 1 comprises a block diagram of an identity authentification system.

Shown (FIG. 1) is a block diagram of the identity authentication system. Contained within the system is an identity transceiver (10) and an verification transceiver (20). The identity transceiver (10) is constructed to be portable and carried as a positive means of identification. The verification transceiver (20) may be constructed as a fixed unit for use at an access point where positive means of identification is necessary for purposes of security or otherwise.

Shown as a part of the verification transceiver (20) are a RF (or ultrasonic or IR) transceiver (25), a decryptor key (26), a decryptor (27), a memory (28), an display (29), a comparator (30), an access controller (31), a parametric detector (32), an access request input (33), and an access grant output (34).

Shown (FIG. 2) is a block diagram of an identification transceiver generally (10). Included within the identification transceiver (10) is a RF transceiver (11), a memory (12), a sequence controller (13), and a control word decoder (14).

The individual blocks shown (FIGS. 1 and 2) for the two transceivers (10 and 20) are well known in the art. No further explanations need be nor will be offered relative to the blocks within FIGS. 1 and 2 other than where appropriate to assist with further understanding of the invention.

Figure 2:
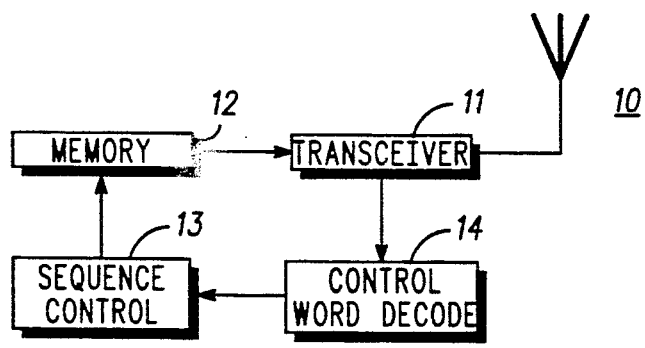
FIG. 2 comprises a block diagram of an identity transceiver.
Figure 3:
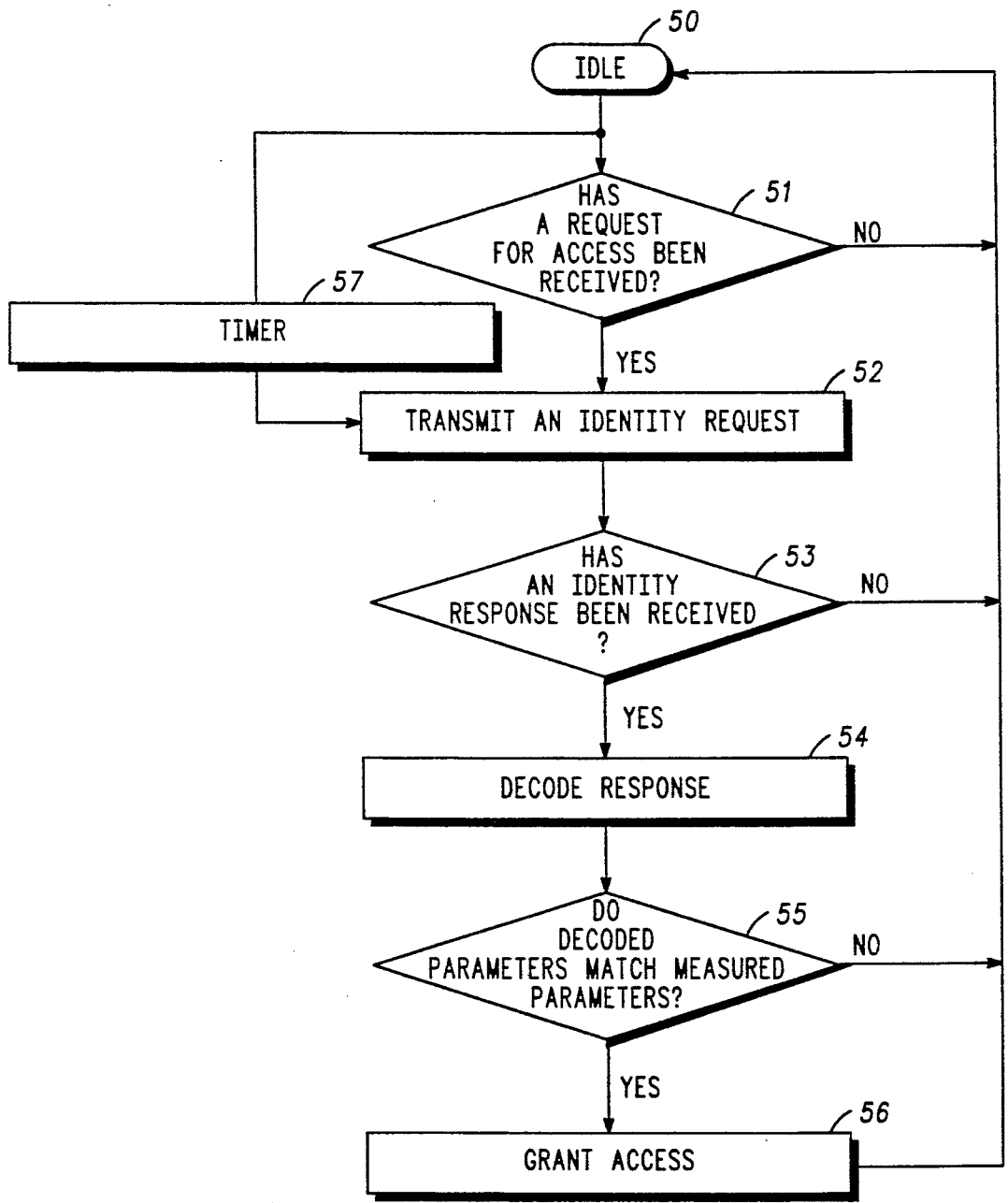
FIG. 3 comprises a flow chart depicting operation of one embodiment of the invention.

Shown in FIG. 3 is a flow chart by which the function of the block diagrams of FIGS. 1 and 2 may be better understood. The verification transceiver (20) periodically, upon expiration of a timer (57) transmits an identification request (52). An identification unit (10) located proximate to the verification transceiver (20) responds with an identifying signal. The verification transceiver receives (53) and decodes the signal (54). The decoded signal is then compared (55) with parametric data measured relative to the possessor to, upon occasion, grants (56) access to an authorized possessor.

Stored within memory (12, FIG. 2) within the identification transceiver is encrypted parametric data relative to an authorized possessor of the identification transceiver (10). The encrypted parametric data may be encrypted by methods well known in the art. Such methods may include supplying an information signal to an encryptor under the control of an encryption key and storing the encrypted data in a memory (12). The process of encrypting data and storing such encrypted data in a memory (12) is well known in the art and need not be discussed further.

The encrypted parametric data stored within the memory (12) may be based on an information signal containing physical attributes (biometric) of an authorized possessor such as height or weight or may be a video image of an authorized possessor containing non-biometric elements such as clothing or eyeglasses. Encrypted parametric data may also include indirectly measured biometric data (indicia of identify) such as relative voice analysis or resistance mapping of the hand of the authorized possessor or acoustic data on bone structure. In general any one or more biometric or non-biometric parameters (or a combination of biometric and non-biometric parameters) may be used as an indicia of identity to uniquely identify an authorized possessor in identity authentification.

Since the encrypted parametric data stored within memory (12) is stored under an encrypted format the possessor of the identification transceiver with the proper equipment could examine the contents of memory (12) within the identification transceiver without being able to decipher the stored parameters. A possessor, in fact, may examine the encrypted data within memory (12) without being able to detect the type of information signal used with the encryption process.

In general identification transceiver (10) is activated upon receipt of an identity request (40, 52) transmitted by the verification transceiver (20) and received by the transceiver (11). The identity request (40, 52) is periodically transmitted. The identity request (40, 52) may contain an ID of authorized target identification transceivers (10).

Upon receipt of the identity request (40, 52) by the identification transceiver (10) the transceiver (11) communicates such request to a control word decoder (14). Upon decoding the identification request and determining that the request contains the proper control information, the control word decoder (14) activates a transmitter (11) and a sequence control (13). The sequence control (13) causes certain encrypted parametric data stored within memory (12) to be transmitted (41) by the transceiver (11) to a transceiver (25, FIG. 1) within the verification transceiver (20).

The transceiver (25) upon receipt of the encrypted parametric data (41, 53) transfers such data into a decryptor (27) under control of a decryptor key (26). The decryptor key (26) provides a facsimile of the signal used in the original encryption of the parametric data stored in memory (12) of the identity transceiver (10). The output of the decryptor (27) is a representation of the information containing the parametric data of the authorized possessor of the identification transceiver (10).

The output of the decryptor (27) is stored in memory (28) for comparison (53) in a comparator (30) with an information signal generated by a parametric detector (32) of physical parameters of a possessor of the identification transceiver (10).

If the information signal measured by the parametric detector (32) matches the encrypted parametric data (41) received from the identification transceiver (10) then the access controller (31) in response to the identity authentification process provides access (34, 56) to the possessor.

In one embodiment of the invention the verification transceiver (20) may control access to a building by controlling a lock on an access door (not shown) through the access grant (34, 56) output. An access request (33) may be provided through activation of a pushbutton on the outside of the access door. The parametric detector (32) may be a video camera and the comparator (30) may be a general purpose computer performing a comparison of the video signal provided by the parametric detector (32) with a video signal received in encrypted format from the identification transceiver (10).

In another embodiment of the invention the parametric detector (32) may be a fingerprint detector (not shown). The possessor provides an access request (33, 51) by pressing his finger to the fingerprint detector. The identification transceiver (10) responds to an identity request (40, 52) by transmitting encrypted parametric data (41) containing representative data of the authorized possessor's fingers. If a match is found access is granted.

In another embodiment of the invention the parametric detector (32) is a retina scanner (not shown). Upon receipt of an identity request (40) the identification transceiver (10) transmits an encrypted representation of the authorized possessor's retina.

In another embodiment of the invention a security guard (not shown) controls transmission of the identity request (40) by activation of a pushbutton upon a request for access (33, FIG. 1) by a possessor of the identification transceiver (10). The encrypted parametric data (41) is received by the verification transceiver (20) as above but the video signal (also, as above) is displayed on an auxiliary video display (29). The security guard (acting as parametric detector (32) and comparator (30) compares a picture on the video display (29) with the face of the possessor of the identification transceiver (10). If the security guard finds a match then the security guard provides an access grant (34) signal by activation of a second pushbutton (not shown) which deactivates a lock (also not shown).

In another embodiment of the invention the verification transceiver (20) remains inactive until the verification transceiver detects the presence of a requesting user through a sensing device (such as a proximity detector). Activation of the sensing device provides indication of access request (33, FIG. 1) to the verification transceiver (20). The verification transceiver (20), in response, transmits an identify request (40). The identity request (40) upon activation of the proximity detector periodically transmitted, as above, until de-activation of the proximity detector or receipt of a response (41).

Figure 4:
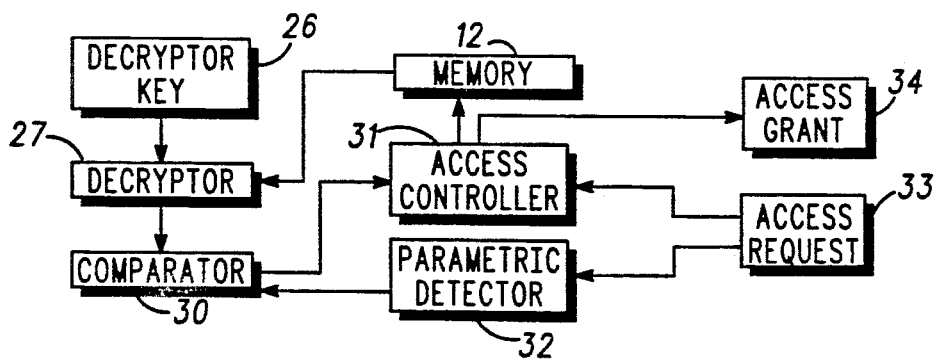
FIG. 4 comprises an identity authentication system for such items as a portable radio.

In another embodiment of the invention the identification transceiver (10) and the verification transceiver (20) are combined (less transceivers 11 and 25) within a single unit in an authentification system (FIG. 4) with application to portable telephones (or automobiles). The parametric detector (32) may be a fingerprint detector (as above) mounted within a push-to-talk (PTT) button of a portable radio. The access request (33) is provided by the PTT button. The access request (34) consists of activation of the radio and transmission of a desired message.

In another embodiment of the invention the identity transceiver (10) is constructed as a subsystem of a portable radio or telephone and is constructed to encrypt (through use of an encode key) a measured parameter (fingerprint on a PTT button) through the use of a non-symmetric Public Key algorithm and to transmit such encrypted parameters to a verification transceiver (20). The verification transceiver is constructed to receive and decode (through the use of a decode key) the encrypted parameter, and grant access to an authorized user based upon a stored parameter within a memory within the verification transceiver (20).

We claim:
1. An identity authentification system comprising:
A) at least one identification transceiver having:
   1) means for receiving transmitted identify requests from a verification transceiver;
   2) memory means for storing encrypted parametric data for an authorized possessor; and
   3) means for transmitting the encrypted parametric data to the verification transceiver in response to the request received by the means for receiving identity requests, and
B) at least one verification transceiver having:
   1) means for periodically transmitting identity requests;
   2) means for receiving the transmitted encrypted parametric data for the authorized possessor from the means for transmitting within the identification transceiver;
   3) means for decrypting the received parametric data;
   4) means for measuring parameters of an identification transceiver possessor; and,
   5) means for comparing the decrypted parametric data with the measured parametric data of a possessor and, upon occasion where the possessor is the authorized possessor, granting access to the authorized possessor.

2. The system as in claim 1 wherein the parametric data includes biometric data.

3. The system as in claim 1 wherein the means for comparing comprises a CRT display and an operator performing duplicate parametric measurements.

4. The system as in claim 1 wherein the means for comparing comprises a computer with a connected parametric measuring system.

5. The system as in claim 1 wherein the encrypted parametric data includes encoded visual data of the authorized possessor.

6. The system as in claim 1 wherein the encrypted parametric data includes indicia of identity.

7. The system as in claim 6 wherein the verification transceiver further includes means for transmitting a verification transceiver ID number with the identity request and the identification transceiver further includes means for responding with selected encoded indicia of identity depending on number of the verification transceiver.

8. A method of providing positive identification of a possessor of an identification transceiver by comparing parameters stored in the identification transceiver with physical parameters of the possessor and and wherein possessors of identification transceivers may be authorized and, upon occasion, unauthorized and wherein certain physical parameters of the authorized possessor have been stored in an encrypted manner in the identification transceiver for retrieval by a verification transceiver for purposes of identifying the possessor as being an authorized possessor, such method comprising the steps of:
  A) transmitting an identity request by the verification transceiver to the identification transceiver;
  B) receiving the identity request by the identification transceiver;
  C) transmitting an identity response to the verification transceiver containing at least some of the stored encrypted parameters;
  D) measuring parameters of an identification transceiver possessor;
  E) decrypting and comparing at least some of the decrypted parameters with the measured parameters of an identification transceiver possessor to identify an authorized possessor; and
  F) granting access to an authorized possessor based upon matching decrypted and measured parametric data.

9. The method as in claim 8 wherein the parametric data contains biometric data.

10. The method as in claim 8 wherein the encrypted parametric data includes encoded visual data of the authorized possessor.

11. The method as in claim 8 wherein the encrypted parametric data includes indicia of identity.

12. The method as in claim 11 wherein the verification transceiver transmits a verification transceiver ID number with the identity request and the identification transceiver responds with selected encoded indicia of identity depending on the ID of the verification transceiver.

13. An identification transceiver comprising: A) means for receiving transmitted identity requests from a verification transceiver; B) memory means for storing encrypted parametric data for an authorized possessor; and, C) means for transmitting the encrypted parametric data to the verification transceiver in response to the request received by the means for receiving identity requests.

14. The transceiver as in claim 13 wherein the parametric data includes biometric data.

15. The transceiver as in claim 13 wherein the encrypted parametric data includes encoded visual data of the authorized possessor.

16. The transceiver as in claim 13 wherein the encrypted parametric data includes indicia of identity.

17. The transceiver as in claim 16 wherein the verification transceiver transmits a verification transceiver ID number with the identity request and the identification transceiver contains a means for transmitting selected encoded indicia of identity depending on the ID number of the verification transceiver.

18. An identity authentification system comprising:
  A) at least one identification transceiver having:
    1) means for receiving transmitted identity requests from a verification transceiver;
    2) means for measuring parametric data of a possessor;
    3) means for encrypting the measured parametric parameter of the possessor using a non-symmetric Public Key algorithm and an encode key; and
    4) means for transmitting the encrypted parametric data to the verification transceiver in response to the request received by the means for receiving identity requests, and
  B) at least one verification transceiver having:
    1) means for periodically transmitting identity requests;
    2) memory means for storing a measured parameter of an authorized user;
    3) means for receiving the transmitted encrypted parametric data for the possessor from the means for transmitting within the identification transceiver;
    4) means for decrypting the received parametric data using the non-symmetric Public Key algorithm and a decode key;
    5) means for comparing the decrypted measured parametric data of the possessor with the stored parametric data of the authorized user; and
    6) means for, upon occasion where the possessor is the authorized user, providing access to the authorized user.

19. The system as in claim 18 providing communication access to a portable radio or telephone.

20. The system as in claim 18 wherein the parametric data includes biometric data.

* * * * *